United States Patent [19]

Sugawara et al.

[11] Patent Number: 4,954,589

[45] Date of Patent: Sep. 4, 1990

[54] SOLUBLE AND CURABLE FLUORINE-CONTAINING COPOLYMER SUITABLE AS PAINT VEHICLE

[75] Inventors: Kiyomi Sugawara, Kamifukuoka; Kentaro Tsutsumi; Mikio Otani, both of Kawagoe, all of Japan

[73] Assignee: Central Glass Company, Limited, Ube, Japan

[21] Appl. No.: 353,032

[22] Filed: May 17, 1989

[30] Foreign Application Priority Data

May 17, 1988 [JP] Japan ................. 63-118353

[51] Int. Cl.$^5$ .............................. C08F 14/22
[52] U.S. Cl. ................... 526/255; 526/249; 526/332; 526/333
[58] Field of Search ............... 526/255, 249, 332, 333, 526/255

[56] References Cited

U.S. PATENT DOCUMENTS 3,362,935 1/1968 Norton ................. 526/243
3,417,062 12/1968 Tomalia ............... 526/243
4,631,326 12/1986 Koishi et al. .......... 526/249

FOREIGN PATENT DOCUMENTS 4019188 8/1965 Japan .................. 526/255
0034108 2/1982 Japan .................. 526/255

Primary Examiner—Joseph L. Schofer
Assistant Examiner—N. Sarofim
Attorney, Agent, or Firm—Fleit, Jacobson, Cohn, Price, Holman & Stern

[57] ABSTRACT

The invention provides a novel copolymer comprising 25-75 mol % of a fluoroolefin such as CTFE, 10-70 mol % of a vinyl or isopropenyl ester of fatty acid, such as finyl acetate or isopropenyl acetate, 3-40 mol % of a hydroxyl-containing allyl ether such as ethylene glycol monoallyl ether, and 0.1-20 mol % of a carboxyl-containing monomer such as finylacetic acid. This copolymer possesses favorable properties characteristic of fluoroesins, is soluble in various organic solvents and is curable at normal temperature by a polyisocyanate. Since the copolymer has carboxyl group, not only inorganic pigments but also organic pigments exhibit very good dispersibility in a solution of this copolymer in an organic solvent. The copolymer can be prepared by a single-stage reaction using a radical polymerization initiator.

9 Claims, No Drawings

SOLUBLE AND CURABLE FLUORINE-CONTAINING COPOLYMER SUITABLE AS PAINT VEHICLE

BACKGROUND OF THE INVENTION

This invention relates to a novel fluoroolefin base multicomponent copolymer which is soluble in various organic solvents, curable at relatively low temperatures and useful as a paint vehicle.

Fluororesins are generally excellent in weather resistance, heat resistance and chemical resistance. Accordingly use of fluororesins as paint vehicles has been developed in the chemical industry, construction industry, machinery industry and food industry. Early developed fluororesin paints were mostly powder paints and emulsion paints because of poor solubilities of readily available fluororesins, and these paints required a high temperature baking treatment. Recently much attention has been directed to fluororesin paints using a fluorine-containing copolymers which is soluble in organic solvents suited to paints and is curable at normal temperature. Fluororesin paints of this type are comparable to ordinary synthetic resin paints in the ease of application and provide paint films superior in chemical resistance and weather resistance.

To modify a fluororesin into another fluororesin which is soluble in practicable organic solvents, usually it is necessary to reduce crystallinity of the fluororesin by copolymerzation to thereby accomplish internal plasticization. Furthermore, there are some other problems to be resolved in using the modified fluororesin as a paint vehicle. The problems include how to retain a desirable degree of rigidity or shear modulus in the modified fluororesin, how to control the molecular weight of the modified resin with a view to desirably adjusting the viscosities of paints and how to select and control the kind and amount of functional groups which are introduced into the modified resin in order to render the resin curable and recoatable. Cost of production also has to be taken into consideration. It is not easy to reach balanced solution for all problems.

U.S. Pat. No. 4,631,326 shows a copolymer of chlorotrifluoroethylene, a vinyl or isopropenyl ester of fatty acid and a hydroxyl-containing allyl ether. This copolymer is soluble in various organic solvents and curable at normal temperature by using a polyisocyanate as curing agent. Therefore, a solution of this copolymer is useful as a liquid vehicle of a paint or coating composition. However, solutions of this copolymer are not satisfactory in respect of dispersibility of organic pigments in the solutions.

In using a solution of a fluororesin as a paint vehicle a matter of important concern is dispersibility of pigments in the solution. If the paint contains a pigment which is not well dispersed or is not stable in the dispersed state, the paint will exhibit unfavorable properties such as unevenness of the color of a paint film and color separation within the paint in storage.

It is known to introduce carboxyl group into a polymer as a measure for improving dispersibility of powders in solutions of the polymer. The application of this technique to fluororesins has been tried, but a relatively simple way such as the use of methacrylic acid as a hydroxyl-containing comonomer has encountered a problem that both the degree of polymerization and the yield of the polymer decrease. To obviate this problem, JP-A 58-136605 proposes first preparing a copolymer of a fluoroolefin and a hydroxyl-containing monomer such as an alkylvinyl ether and then reacting the copolymer with a dibasic acid anhydride to thereby introduce carboxyl group into the copolymer at the positions of at least a portion of the hydroxyl groups. From a practical point of view, this method has disadvantages such as the necessity of performing two reactions, a relatively high temperature (about 100° C.) for the second reaction in which one of the reactants is a polymer and a tendency to coloring of the modified copolymer.

SUMMARY OF THE INVENTION

It is an object of the present invention to provide a novel fluorine-containing copolymer which has carboxyl group, can easily be prepared by a simple copolymerization process and, as a solution in an organic solvent, is useful as a paint vehicle.

By using a combination of a fluoroolefin and three kinds of specially selected monomers, we have succeeded in preparing a novel copolymer into which hydroxyl group to afford curability to the copolymer and carboxyl group to improve dispersibility of pigments in a solution of the copolymer are simultaneously introduced during copolymerization of all the monomers by a single-stage process.

According to the invention there is provided a curable copolymer comprising 25–75 mol % of first repeating units which originate from a fluoroolefin, 10–70 mol % of second repeating units which originate from a fatty acid ester selected from vinyl esters and isopropenyl esters, 3–40 mol % of third repeating units which originate from a hydroxyl-containing allyl ether and 0.1–20 mol % of fourth repeating units which originate from a carboxyl-containing monomer.

Optionally, a copolymer according to the invention may further comprise not more than 10 mol % of repeating units which originate from a monomer or monomers different from the above defined essential monomers.

A typical example of copolymers according to the invention is a copolymer of chlorotrifluoroethylene, vinyl acetate or isopropenyl acetate, ethylene glycol monoallyl ether and vinylacetic acid.

The present invention can be taken as incorporating carboxyl-containing repeating units into a copolymer according to U.S. Pat. No. 4,631,326 to improve the copolymer in respect of dispersibility of pigments, in particular organic pigments, in a solution of the copolymer.

A copolymer according to the invention is excellent in chemical resistance and weather resistance since it has C—F bond in the molecular chain, and this copolymer is high in transparency. This copolymer is easily curable by an ordinary curing agent such as a polyisocyanate and is soluble in various kinds of organic solvents. A solution of this copolymer and a curing agent is useful as a coating liquid composition which can be applied to various metallic and nonmetallic surfaces to form a hard coating film. The obtained coating film is strong in adhesion to the substrate surface and possesses physical and chemical properties characteristic of fluororesins. When the coating liquid composition is a paint composition containing a pigment, it is an important merit of using a copolymer of the invention that the pigment particles easily disperse in the solution and stably remain in the dispersed state. Such a good dispersion is obtained even when an organic pigment is used.

A copolymer according to the invention can be prepared by a single-stage polymerization reaction which is carried out at a relatively low temperature by using a conventional radical polymerization initiator.

DESCRIPTION OF THE PREFERRED EMBODIMENTS

Good examples of fluoroolefins useful in this invention are chlorotrifluoroethylene, trifluoroethylene, tetrafluoroethylene, hexafluoropropene, vinyl fluoride and vinylidene fluoride. In view of polymerizing reactivities, chlorotrifluoroethylene and tetrafluoroethylene are preferred.

The second component is either a fatty acid vinyl ester or a fatty acid isopropenyl ester. Suitable fatty acid vinyl esters are vinyl acetate, vinyl lactate, vinyl butyrate, vinyl isobutyrate, vinyl caproate, vinyl isocaproate, vinyl pivalate, vinyl caprylate, and VEOVER-9 and VEOVER-10 which are tradenames of ShowaShell Chem. Co. for fatty acid vinyl esters having $C_9$- and $C_{10}$-alkyl groups, respectively. That is, it is suitable to use vinyl ester of a fatty acid with alkyl group having not more than 10 carbon atoms. Fatty acid isopropenyl esters suited to this invention are isopropenyl acetate and isopropenyl propionate. As an isopropenyl ester it is preferable to use isopropenyl acetate because of ease of preparing a desired copolymer.

The third component which provides functional groups to the copolymer is a hydroxyl-containing allyl ether represented by the following general formula.

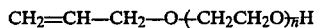

$$CH_2=CH-CH_2-O(-CH_2CH_2O)_{\overline{n}}H$$

Examples of useful allyl ethers are ethylene glycol monoallyl ether, diethylene glycol monoallyl ether, triethylene glycol monoallyl ether and hydroxypropylallyl ether. It is preferred to use an allyl ether for which n in the above general formula is 1 or 2.

As the principal feature of the invention, a carboxyl-containing monomer is employed as the fourth component of the copolymer. Examples of useful carboxyl-containing monomers are allylacetic acid, vinylacetic acid, allyloxyacetic acid, acrylic acid, methacrylic acid and maleic anhydride, and it is preferred to use vinylacetic acid, allyloxyacetic acid or acrylic acid.

Besides the above described essential components, another monomer or some other monomers may optionally be incorporated into a copolymer according to the invention on condition that the optional monomer(s) does not occupy more than 10 mol % of the copolymer. For example, an optional comonomer can be chosen from acrylates and methacrylates such as hydroxyethyl acrylate, methyl methacrylate and glycidyl methacrylate, acrylic amides such as acrylamide and N-methylol acrylamide and vinyl ethers such as ethylvinyl ether and butylvinyl ether.

The amounts of the essential four components of the copolymer are limited within the ranges specified hereinbefore, respectively, in view of the following tendencies.

If the amount of a fluoroolefin is too large the copolymer becomes low in solubilities in organic solvents and, besides, it becomes difficult to prepare the copolymer at high yield. If the amount of the fluoroolefin is too small the copolymer becomes insufficient in chemical resistance and weather resistance. It is preferred that the repeating units originating from a fluoroolefin amount to 40-60 mol %. If the amount of a fatty acid ester is too small the copolymer will become low in molecular weight, and some difficulty will arise in preparing the copolymer. If the amount of this component is too large the copolymer becomes insufficient in chemical resistance and weather resistance. It is preferred that the repeating units originating from a vinyl or isopropenyl ester of fatty acid amount to 20-50 mol %. If the amount of a hydroxyl-containing allyl ether is too small the copolymer becomes weak in susceptibility to curing reaction and, hence, becomes insufficient in chemical resistance and weather resistance, and a coating or painting liquid composition using the copolymer becomes poor in recoatability. If the amount of this component is too large the copolymer will become low in molecular weight, and some difficulty will arise in preparing the copolymer. It is preferred that the hydroxyl-containing allyl ether component amounts to 5-30 mol %.

The copolymer should have at least 0.1 mol % of repeating units originating from a carboxyl-containing monomer for improving dispersibility of pigment in a solution of the copolymer. However, if the amount of this component is increased to more than 20 mol % it is difficult to prepare the copolymer with a sufficiently high molecular weight and at good yield, and the obtained copolymer is relatively low in solubilities in organic solvents. It is preferred that the repeating units originating from a carboxyl-containing monomer amount to 0.3-10 mol %.

If the copolymer contains more than 10 mol % of an optional component the copolymer will be insufficient in solubilities and transparency, and some difficulty will arise in preparing the copolymer. It is preferred that the amount of repeating units originating from an optional monomer or optional monomers is not more than 8 mol %.

It is desirable to adjust the composition of a copolymer according to the invention such that the intrinsic viscosity of the copolymer dissolved in tetrahydrofuran at 30° C. falls in the range from 0.05-2.0 dl/g. When the intrinsic viscosity is too high the copolymer may not be desirably high in solubilities in various organic solvents. When the intrinsic viscosity is too low paint or coating compositions using a solution of the copolymer may not be satisfactory in applicability and may not provide paint or coating films having good properties.

A copolymer according to the invention is obtained by copolymerizing the essential four kinds of monomers, and the optional monomer(s) if used, in the presence of a radical polymerization initiator. The manner of the copolymerizing reaction is not particularly limited. For example, the object can be accomplished by solution polymerization, emulsion polymerization, suspension polymerization or bulk polymerization. As to the purity of each monomer, gas chromatography purity of 98% or above is sufficient on condition that impurities obstructive to usual radical polymerization reactions are not contained.

The copolymerization reaction is carried out at temperatures ranging from about −30° C. to about 100° C. An optimum temperature for the reaction depends on the kind of the polymerization initiator, but usually it is suitable to carry out the reaction at a temperature in the range from 0° C. to 70° C. A suitable radical polymerization initiator can be selected from oil-soluble initiators including organic peroxides such as diisopropyl peroxydicarbonate, t-butyl peroxypivalate, di-2-ethylhexyl peroxydicarbonate, benzoyl peroxide, lauroyl peroxide, propionyl peroxide, trichloroacetyl peroxide, perfluorobutyryl peroxide and perfluorooctanoyl peroxide, azo compounds such as azobisisobutyronitrile and azobis-2,4-dimethylvaleronitrile and organic compounds such as oxytriethylboron and peroxytriethylboron, and also from water-soluble initiators such as hydrogen peroxide, potassium persulfate, ammonium persulfate and redox-type initiators.

For the radical copolymerization reaction a suitable liquid medium is selected from water and organic solvents such as hydrocarbons and fluorinated hydrocarbons. If desired a mixture of two or three kinds of liquids may be used. In the case of copolymerization reaction in an aqueous medium it is usual to use a dispersing agent or an emulsifying agent for stabilizing the dispersion.

It is favorable to carry out the copolymerization reaction in the presence of an acid acceptor to capture acid matter formed by the copolymerization reaction. For example, sodium borate, sodium metaborate, sodium carbonate, potassium carbonate, calcium carbonate, zeolite, silica or silica gel can be used as the acid acceptor. It suffices that the acid acceptor amounts to 0.01–5 wt % of the total of the monomers subjected to copolymerization.

Copolymers of the invention are soluble in various organic solvents including cyclic ethers such as dioxane and tetrahydrofuran, aromatic hydrocarbons represented by benzene and toluene, esters such as ethyl acetate and butyl acetate, ketones such as acetone, methylethyl ketone, methylisobutyl ketone and cyclohexanone, nitrogen-containing solvents such as dimethylformamide, dimethylacetamide and pyridine and halogen-containing solvents such as 1,1,1-trichloroethane and trichloroethylene. A clear and colorless solution is obtained by dissolving a copolymer of the invention in any of these solvents.

A copolymer of the invention has active hydrogen in the molecular chain and, hence, can be cured by reaction with a compound having a functional group that reacts with active hydrogen. When a coating liquid is prepared by adding a polyisocyanate to a solution of the copolymer in an organic solvent and the solvent is dissipated after applying the coating liquid to a desired surface, curing reaction of the copolymer with the polyisocyanate proceeds at normal temperature. When a blocked polyisocyanate is used the curing reaction is accomplished by heat treatment at a temperature above the dissociation temperature of the polyisocyanate. In either case a well cured hard coating film is obtained. The curing agent is not limited to polyisocyanates. It is also possible to use melamine, urea resin or a polybasic acid or its anhydride, though heating is needed for accomplishment of curing reaction.

A paint composition is obtained by dispersing a pigment in a solution of a copolymer of the invention and a curing agent in an organic solvent. Either an inorganic pigment or an organic pigment can be used, and in either case the pigment exhibits very good dispersibility in the solution. Besides a pigment, desired additives such as, for example, an ultraviolet absorbing agent and a dispersion stabilizing agent may be added to the solution. Such optional additives too exhibit good dispersibility in the solution.

EXAMPLE 1

A 1-liter stainless steel autoclave provided with an electromagnetic stirrer was charged with 135.6 g of vinyl acetate (VAc), 41.3 g of ethylene glycol monoallyl ether (EGMAE), 3.9 g of vinylacetic acid (VAcA), 253.3 g of n-butyl acetate and 2.34 g of a commercial radical polymerization initiator (PERROYL NPP of Nippon Oil & Fats Co., a peroxide). The gas atmosphere in the autoclave was replaced by nitrogen gas, and this operation was repeated twice. After that the nitrogen gas was purged from the autoclave, and 288.3 g of chlorotrifluoroethylene (CTFE) was introduced into the autoclave. Then the temperature in the autoclave was gradually raised up to 40° C., at which radical polymerization reaction was carried out for 24 hr. After that unreacted CTFE was discharged from the autoclave, and the reaction liquid was taken out of the autoclave. The reaction liquid was washed with a large quantity of water to remove the solvent and impurities, and a precipitated product was dried.

The dry product was 381 g of a CTFE/VAc/EGMAE/VAcA (42.5/47.5/9.0/1.0 by mol) copolymer. This copolymer had a number average molecular weight of 22000 (determined by assuming the copolymer to be polystyrene), and the copolymer had an OH value of 56 (mg KOH/g) and an acid value of 6 (mg KOH/g).

EXAMPLE 2

The copolymerization process of Example 1 was repeated except that the quantity of EGMAE was increased to 43.7 g and that the quantity of VAcA was decreased to 1.9 g.

In this case the dry product was 370 g of a CTFE/VAc/EGMAE/VAcA (42.3/50.1/6.8/0.8 by mol) copolymer, which had a number average molecular weight of 19800 (determined by assuming the copolymer to be polystyrene). The copolymer had an OH value of 41 (mg KOH/g) and an acid value of 5 (mg KOH/g).

EXAMPLE 3

The autoclave used in Example 1 was charged with 120.5 g of VAc, 36.8 g of EGMAE, 3.0 g of acrylic acid (AA), 250 g of n-butyl acetate and 2.08 g of PERROYL NPP. The gas atmosphere in the autoclave was replaced by nitrogen gas, and this operation was repeated twice, and then the nitrogen gas was purged from the autoclave. After that 256.3 g of CTFE was introduced into the autoclave, and radical copolymerization reaction was carried out at 40° C. for 24 hr. After discharging unreacted CTFE from the autoclave the reaction liquid was taken out of the autoclave and treated in the same manner as in Example 1.

In this case the dry product was 325 g of a CTFE/VAc/EGMAE/AA (42.7/48.8/7.5/1.0) copolymer, which had a number average molecular weight of 19700 (determined by assuming the copolymer to be polystyrene). The copolymer had an OH value of 55 (mg KOH/g) and an acid value of 6 (mg KOH/g).

COMPARATIVE EXAMPLE

The autoclave used in Example 1 was charged with 242 g of VAc, 82 g of EGMAE, 500 g of n-butyl acetate and 4 g of PERROYL NPP. The gas atmosphere in the autoclave was replaced by nitrogen gas, and this operation was repeated twice, and then the nitrogen gas was purged from the autoclave. After that 514 g of CTFE was introduced into the autoclave, and radical copolymerization reaction was carried out at 40° C. for 24 hr. After discharging unreacted CTFE from the autoclave the reaction liquid was taken out of the autoclave and treated in the same manner as in Example 1.

In this case the dry product was 680 g of a CTFE/VAc/EGMAE (42.8/47.0/10.2 by mol) copolymer, which had a number average molecular weight of 19000 (determined by assuming the copolymer to be polystyrene). The copolymer had an OH value of 57 (mg KOH/g).

EVALUATION TEST 1

Each of the copolymers prepared in Examples 1 to 3 and Comparative Example was dissolved in a mixture of n-butyl acetate (70%) and toluene (30%) to obtain 50 wt % solution of the copolymer.

Using the 50 wt % solution of each copolymer, a white paint liquid was prepared by dispersing 50 parts by weight of a white pigment (titanium oxide) in 100 parts by weight of the copolymer solution by mixing in a ball mill for 2 hr.

Also using the 50 wt % solution of each copolymer, a red paint liquid was prepared by dispersing 6 parts by weight of an organic red pigment in 100 parts by weight of the copolymer solution by mixing in a ball mill for 2 hr.

For each copolymer, the white paint liquid and the red paint liquie were mixted in the proportion of 98:2 by weight. The mixed paint liquid was applied to a polyethylene terephthalate film, and the paint film was left drying. After the lapse of 3 min from the application of the paint liquid the paint film was rubbed in a limited area, and the amount of color difference between the rubbed area and the remaining area was measured with a color-difference meter of a colorimeter type. The local rubbing of the paint film and the measurement of color difference were repeated twice at intervals of 3 min. In the paint films using the copolymers of Examples 1 to 3 the measurements of color difference falled in the range from 0.3 to 0.7. These small values of color difference are indicative of good dispersion of both the white (inorganic) pigment and the red (organic) pigments in the mixed paint liquid. In the paint film using the copolymer of Comparative Example the measurements of color difference ranged from 1.5 to 2.0.

EVALUATION TEST 2

Each of the copolymers prepared in Examples 1 to 3 and Comparative Example was dissolved in a mixture of n-butyl acetate (70%) and toluene (30%) to obtain 50 wt % solution of the copolymer. The solution of each copolymer was divided into many portions, and the six kinds of inorganic pigments and the five kinds of organic pigments shown in the following table were each individually dispersed in the copolymer solution. In the cases of the inorganic pigments 25 parts by weight of a pigment was dispersed in 100 parts by weight of the copolymer solution. In the cases of the organic pigments 6 parts by weight of a pigment was dispersed in 100 parts by weight of the copolymer solution. In every case the pigment and the solution were mixed in a ball mill for 2 hr.

A sample of each of the thus prepared paint liquids was left standing to measure the rate of settling of the dispersed pigment. The measured rates of settling were converted into five marks, 1 (worst), 2, 3, 4 and 5 (best).

Each of the paint liquids containing inorganic pigment was mixed with a paint liquid containing an organic pigment of a different hue in the proportion of 98:2 by weight. A sample of each of the mixed paint liquids was left standing to examine the degree of separation of the two kinds of pigments. The results were classified into five marks, 1 (worst), 2, 3, 4 and 5 (best). As another test, each of the mixed paint liquids was applied to a polyethylene terephthalate film, and, by the same method as in Evaluation Test 1, the local rubbing of the paint film and the measurement of resultant color difference were made. The color difference values were converted into five marks, 1 (worst), 2, 3, 4 and 5 (best).

For each paint liquid the dispersibility of the pigment was evaluated by summing the points obtained in the above three tests. Mark "A" was given when the total was more than 10 points, mark "B" when the total was 6 to 10 points, and mark "C" when the total was less than 6 points. The results are shown in the following table.

|  | Dispersibility of Pigment in Copolymer Solution | | | |
|---|---|---|---|---|
|  | Ex. 1 | Ex. 2 | Ex. 3 | Comp. Ex. |
| Inorganic Pigment |  |  |  |  |
| titanium oxide (white) | A | A | A | A |
| burned pigment blue | A | A | A | A |
| burned pigment green | A | A | A | A |
| burned pigment yellow | A | A | A | A |
| burned pigment black | A | A | A | A |
| red iron oxide | A | A | A | B |
| Organic Pigment |  |  |  |  |
| quinacridone red | A | A | A | C |
| cyanine blue | A | A | B | C |
| chromophthal yellow | A | A | B | C |
| cyanine green | B | C | B | C |
| carbon black | B | B | B | C |

What is claimed is:

1. A copolymer comprising:
   25 to 75 mol % of first repeating units which originate from a fluoroolefin;
   10 to 70 mol % of second repeating units which originate from a fatty acid ester selected from the group consisting of vinyl esters and isopropenyl esters;
   3 to 40 mol % of third repeating units which originate from a hydroxyl-containing allyl ether; and
   0.1 to 20 mol % of fourth repeating units which originate from a carboxyl-containing monomer, selected from the group consisting of acrylic acid, vinylacetic acid, allyloxyacetic acid, allylacetic acid, methacrylic acid and maleic anhydride.

2. A copolymer according to claim 1, further comprising not more than 10 mol % of fifth repeating units which originate from at least one fifth monomer selected from the group consisting of acrylates, methacrylates, acrylic amides and vinyl ethers.

3. A copolymer according to claim 2, wherein the amount of said fifth repeating units is not more than 8 mol %.

4. A copolymer according to claim 1, wherein said first, second, third and fourth repeating units amount to 40–60 mol %, 20–50 mol %, 5–30 mol % and 0.3–10 mol %, respectively.

5. A copolymer according to claim 1, wherein said fluoroolefin is selected from the group consisting of chlorotrifluoroethylene, trifluoroethylene, tetrafluoroethylene, hexafluoropropene, vinyl fluoride and vinylidene fluoride.

6. A copolymer according to claim 1, wherein said fatty acid ester is a vinyl ester of a fatty acid with an alkyl group having not more than 10 carbon atoms.

7. A copolymer according to claim 1, wherein said fatty acid ester is selected from the group consisting of isopropenyl acetate and isopropenyl propionate.

8. A copolymer according to claim 1, wherein said hydroxyl-containing allyl ether is selected from the group consisting of ethylene glycol monoallyl ether, diethylene glycol monoallyl ether, triethylene glycol monoallyl ether and hydroxypropylallyl ether.

9. A copolymer according to claim 1, wherein the proportions of said first, second, third and fourth repeating units are such that the intrinsic viscosity of the copolymer in tetrahydrofuran is in the range from 0.05 to 2.0 dl/g at 30° C.

* * * * *